United States Patent
Kim

(10) Patent No.: US 7,386,876 B2
(45) Date of Patent: Jun. 10, 2008

(54) MAC ADDRESS-BASED COMMUNICATION RESTRICTING METHOD

(75) Inventor: Young-Il Kim, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 767 days.

(21) Appl. No.: 09/899,293

(22) Filed: Jul. 6, 2001

(65) Prior Publication Data

US 2002/0010869 A1 Jan. 24, 2002

(30) Foreign Application Priority Data

Jul. 6, 2000 (KR) ................................ 2000-38560

(51) Int. Cl.
*H04L 9/00* (2006.01)
*H04L 9/32* (2006.01)
*G06F 17/00* (2006.01)

(52) U.S. Cl. ............................. 726/3; 713/154; 726/13
(58) Field of Classification Search ................ 703/201; 395/187; 370/471; 340/825
See application file for complete search history.

(56) References Cited

U.S. PATENT DOCUMENTS

| | | | |
|---|---|---|---|
| 5,489,896 A * | 2/1996 | Sofer et al. ................ 370/445 |
| 5,790,554 A * | 8/1998 | Pitcher et al. ............... 370/471 |
| 5,805,801 A * | 9/1998 | Holloway et al. ........... 713/201 |
| 5,919,257 A | 7/1999 | Trostle |
| 5,935,245 A * | 8/1999 | Sherer ......................... 713/200 |
| 5,958,053 A | 9/1999 | Denker |
| 6,067,620 A | 5/2000 | Holden et al. |
| 6,131,163 A | 10/2000 | Wiegel |
| 6,167,052 A | 12/2000 | McNeill et al. |

OTHER PUBLICATIONS

XP002181855, filed Jul. 24, 1996.
XP002181853, filed Apr. 1998.
Communication dated Nov. 21, 2001 issued by European Patent Office regarding corresponding European Patent application (Patent No. 01116227.8-1525-, Ref. No. EP21774-03481).

* cited by examiner

*Primary Examiner*—Christopher Revak
*Assistant Examiner*—Kaveh Abrishamkar
(74) *Attorney, Agent, or Firm*—Robert E. Bushnell, Esq.

(57) ABSTRACT

A MAC address-based communication restricting method is disclosed. In the MAC address-based communication restricting method, packet data is received upon request of communication through an Ethernet switch, a MAC destination address and a MAC source address of the received packet data are read, it is determined whether access vectors of the MAC addresses are present in an address entry table, and access is denied if the access vectors (security keys) of the MAC destination and source addresses are not matched.

8 Claims, 3 Drawing Sheets

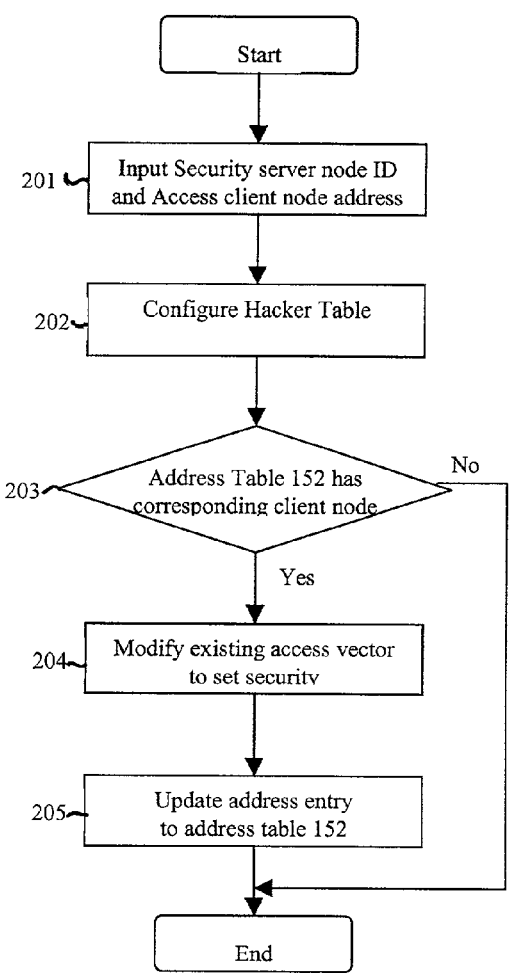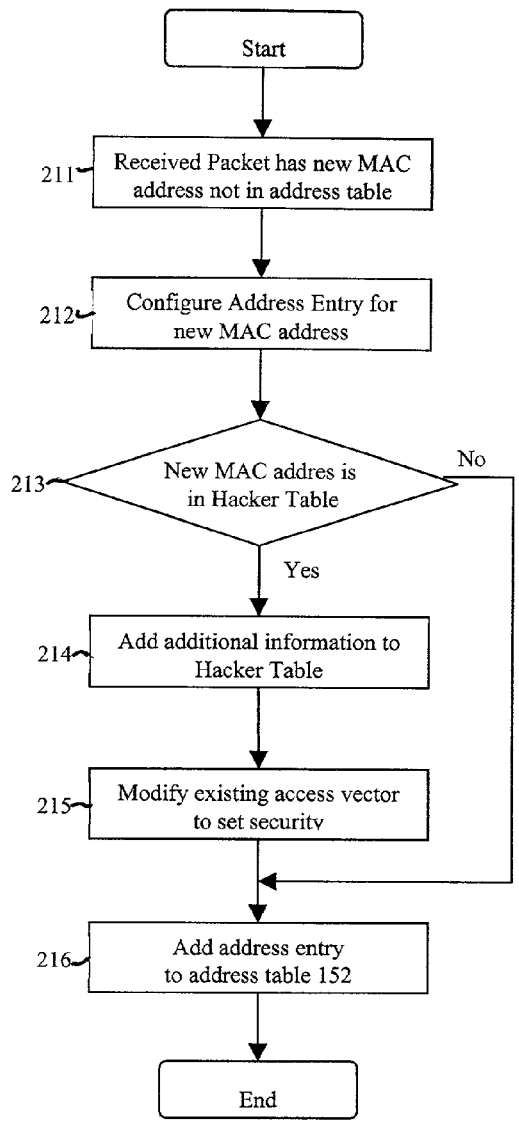
Fig. 2-1
Fig. 2-2

MAC ADDRESS-BASED COMMUNICATION RESTRICTING METHOD

CLAIM OF PRIORITY

This application makes reference to, incorporates the same herein, and claims all benefits accruing under 35 U.S.C §119 from an application entitled Secure Communicating Method by MAC Address earlier filed in the Korean Industrial Property Office on Jul. 6, 2000, and there duly assigned Ser. No. 2000-38560 by that Office.

BACKGROUND OF THE INVENTION

1. Field of the Invention

The present invention relates generally to a communication restricting method in an Ethernet switch, and in particular, to a communication restricting method in which access is controlled on a data link layer 2 by designating a particular terminal as a server and some nodes as communicable with the server terminal using MAC (Media Access Control) addresses.

2. Description of the Related Art

Worldwide communication is accomplished by an ISO standard referred to as OSI (Open System Interconnection) that defines a networking framework for implementing protocols in seven layers: Application Layer 7; Presentation Layer 6; Session Layer 5; Transport Layer 4; Network Layer 3; Data Link Layer 2; and Physical Layer 1. Control is passed from one layer to the next, starting at the application layer 7 in one station, proceeding to the bottom layer over a communication path (channel) to a next station and back up the hierarchy.

Data link control (DLC) is performed by the second lowest layer, data link layer 2, in the hierarchy. Every network interface card (NIC) has a DLC address or DLC identifier (DLCI) that uniquely identifies a node on the network. Some network protocols, such as Ethernet, use the DLC addresses exclusively. The data link layer 2 comprises two sublayers, a logical link control (LLC) layer and media access control (MAC) layer.

A MAC address is a hardware address that uniquely identifies each node of a network. The MAC layer interfaces directly with the network media. Consequently, each different type of network media requires a different MAC layer.

A common connection point for devices in a network is a hub, commonly used to connect segments of a LAN (Local Area Network). A hub contains multiple ports. When a packet arrives at one port, it is copied to the other ports so that all segments of the LAN see all packets. To improve performance and increase bandwidth, the hub has given way to switching hubs or port-switching hubs that forward packets to an appropriate port based on the packets address. Some newer switching hubs support both Ethernet (10 Mpbs) and Fast Ethernet (100 Mbps) ports. The Ethernet is a LAN protocol.

An Ethernet switch can efficiently transfer a plurality of packets from an Ethernet segment to another segment, thereby decreasing traffic over a network. By connecting a plurality of terminals to a plurality of ports of an Ethernet switch, data communication is conducted without contention on a LAN (Local Area Network) and a host terminal is designated among the plurality of terminals to store important information.

A switched Ethernet is defined as an Ethernet LAN that uses switches to connect individual hosts or segments. In the case of individual hosts, the switch replaces a repeater and effectively gives the device full 10 Mbps bandwidth (or 100 Mbps for Fast Ethernet) to the rest of the network. This type of network is sometimes called a desktop switched Ethernet. In the case of segments, the hub is replaced with a switching hub. Traditional Ethernets, in which all hosts are connected to the same bus and compete with one another for the same bandwidth, are called shared Ethernets.

Switched Ethernets are becoming very popular because they are an effective and convenient way to extend the bandwidth of existing Ethernets. That is, a switched Ethernet has one or more direct, point-to-point connections between hosts or segments. Devices connected to the Ethernet switch do not compete with each other and therefore have dedicated bandwidth.

To protect server nodes connected to the Ethernet switch against hacking, a workstation is connected to the Ethernet switch, a firewall is provided to the workstation, IP (Internet Protocol) addresses are registered in the firewall, and the server terminal is connected to the workstation.

A firewall is a system implemented by hardware and/or software to prevent unauthorized access to or from a private network, and are frequently used to prevent unauthorized Internet users (hackers) from accessing private networks connected to the Internet, especially intranets.

When an external client terminal tries to access the server terminal, a path is connected between the external client terminal and the server terminal only when the IP address of the external terminal is registered.

There are several types of known firewall techniques, one of which uses packet filtering. Packet filtering controls access to a network by analyzing the incoming and outgoing packets and letting them pass or halting them based in the source and destination IP addresses. The security function of packet filtering as a firewall technique is susceptible to attacks by hackers using a hacking technique called IP spoofing, wherein, forged IP source addresses are used to circumvent a firewall. That is, an attacking node uses an IP source address of a "trusted" node to try to get past a firewall of a target server.

Thus, the packet appears to have come from inside the protected network and to be eligible for forwarding into the network. Consequently, access security to the information stored in the server terminal is not guaranteed.

Security for computers connected to a network is discussed in the following patents, incorporated-by-reference: U.S. Pat. No. 5,919,257 to Jonathan Trostle entitled Network Workstation Intrusion Detection System; U.S. Pat. No. 5,958,053 to John S. Denker entitled Communications Protocol With Improved Security; U.S. Pat. No. 6,067,620 to James M. Holden et al. entitled Stand Alone Security Device For Computer Networks; U.S. Pat. No. 6,131,163 to Scott L. Wiegel entitled Network Gateway Mechanism Having A Protocol Stack Proxy; and U.S. Pat. No. 6,167,052 to Thomas G. McNeill et al. entitled Establishing connectivity In Networks.

SUMMARY OF THE INVENTION

It is, therefore, an object of the present invention to provide a method of restricting access to a server terminal from an unauthorized external client terminal using a MAC address in an Ethernet switch.

To achieve the above object, there is provided a MAC address-based communication restricting method. In the MAC address-based communication restricting method, packet data is received upon request of communication through an Ethernet switch, a destination address and a source address of the received packet data are read, it is determined whether access vectors of the addresses are present in an address entry table, and access is denied if the access vectors (security keys) of destination and source addresses are not matched.

BRIEF DESCRIPTION OF THE DRAWINGS

A more complete appreciation of the present invention, and many of the attendant advantages thereof, will become readily apparent as the same becomes better understood by a reference to the following detailed description when considered in conjunction with the accompanying drawings in which like reference symbols indicate the same or similar components, wherein:

FIGS. 2-1 and 2-2 are flowcharts illustrating a control operation for registering one entry of host or client mode using MAC addresses according to the embodiment of the present invention.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
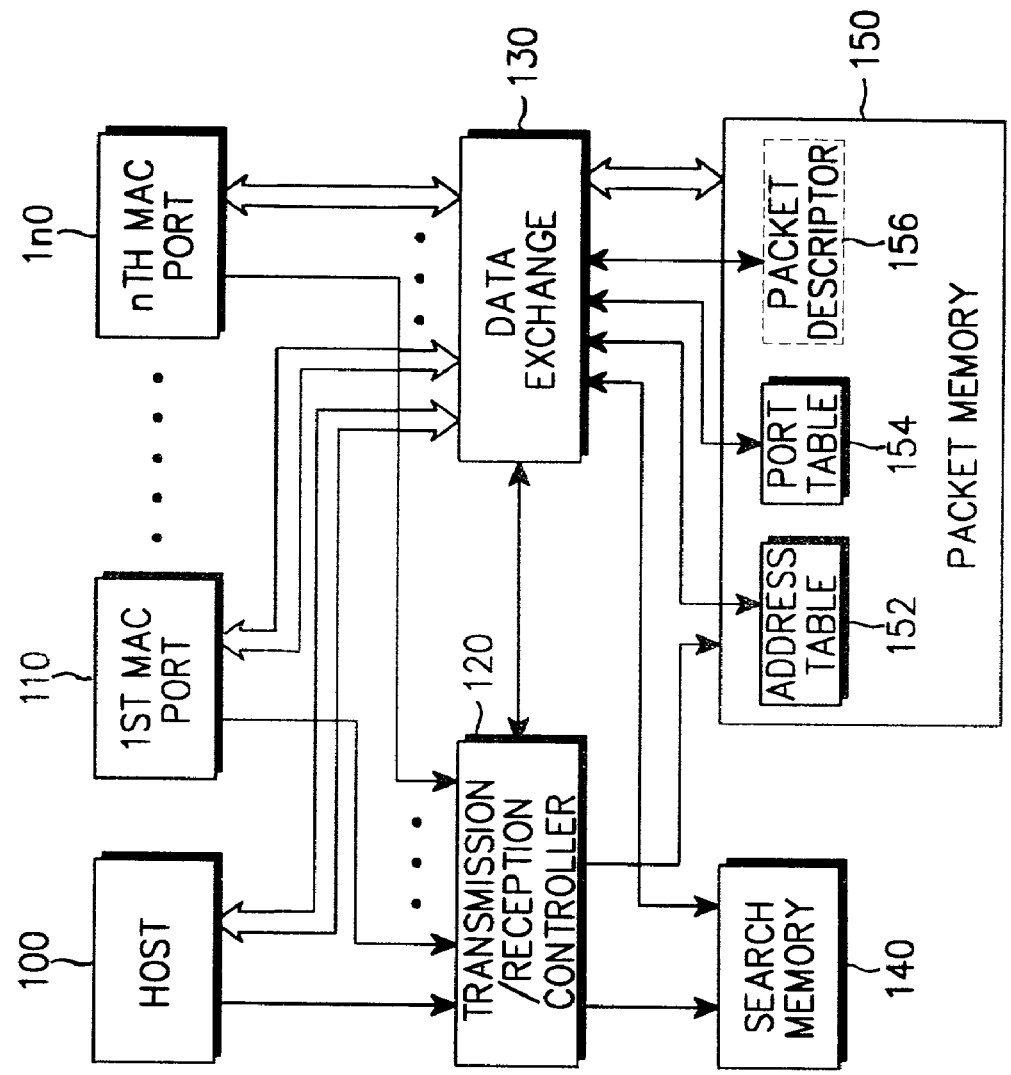
FIG. 1 is a block diagram of a packet switch according to an embodiment of the present invention.

FIG. 1 is a block diagram of a packet switch (i.e., Ethernet switch) according to an embodiment of the present invention.

Referring to FIG. 1, a host 100 provides overall control to the packet switch. The host 100 takes charge of the highest layer, application layer 7, and executes a command input to the packet switch. First to nth MAC ports, 110 to mn0, may be connected to another packet switch, a router, or a PC (Personal Computer), for performing a standard MAC control operation and outputting a transmit/receive command of a data packet to a transmission/reception controller 120. A data exchange 130 under control of a transmission/reception controller 120 establishes paths of data and control signal between the host 100 or the first to nth MAC ports 110 to 1n0 and a packet memory 150.

A search memory 140 stores information by which an output MAC port corresponding to a destination address of a received packet is determined. The packet memory 150 includes a plurality of information resources, namely, an address table 152, a port table 154, and a packet descriptor 156. The packet memory 150 also stores received data packets. The address table 152 stores information related to MAC addresses and the port table 154 stores information about the current status, port attributes enable/disable, and packet reception completion of each MAC port. The packet descriptor 156 stores information about each packet stored in the packet memory 150, such as packet connection information.

The transmission/reception controller 120 controls transmission/reception of packets through the first to nth MAC ports 110 to mn0 according to the packet transmission/reception command from the first to nth MAC ports 110 to 1n0. That is, the transmission/reception controller 120 temporarily stores received data packets, accesses a search memory 140, checks whether a destination address in the header of a received packet has been registered, and locates where the registered MAC address is stored in the address table 152. The transmission/reception controller 120 determines a MAC port through which the received packet is to be output.

The transmission/reception controller 120 accesses the address table 152, the port table 154, and the packet descriptor 156 and stores the received data packet in the packet memory 150. For transmission of a packet, the transmission/reception controller 120 accesses the address table 152, the port table 154, and the packet descriptor 156, and transmits a data packet stored in the packet memory 150 through a corresponding output port.

Figure 3:
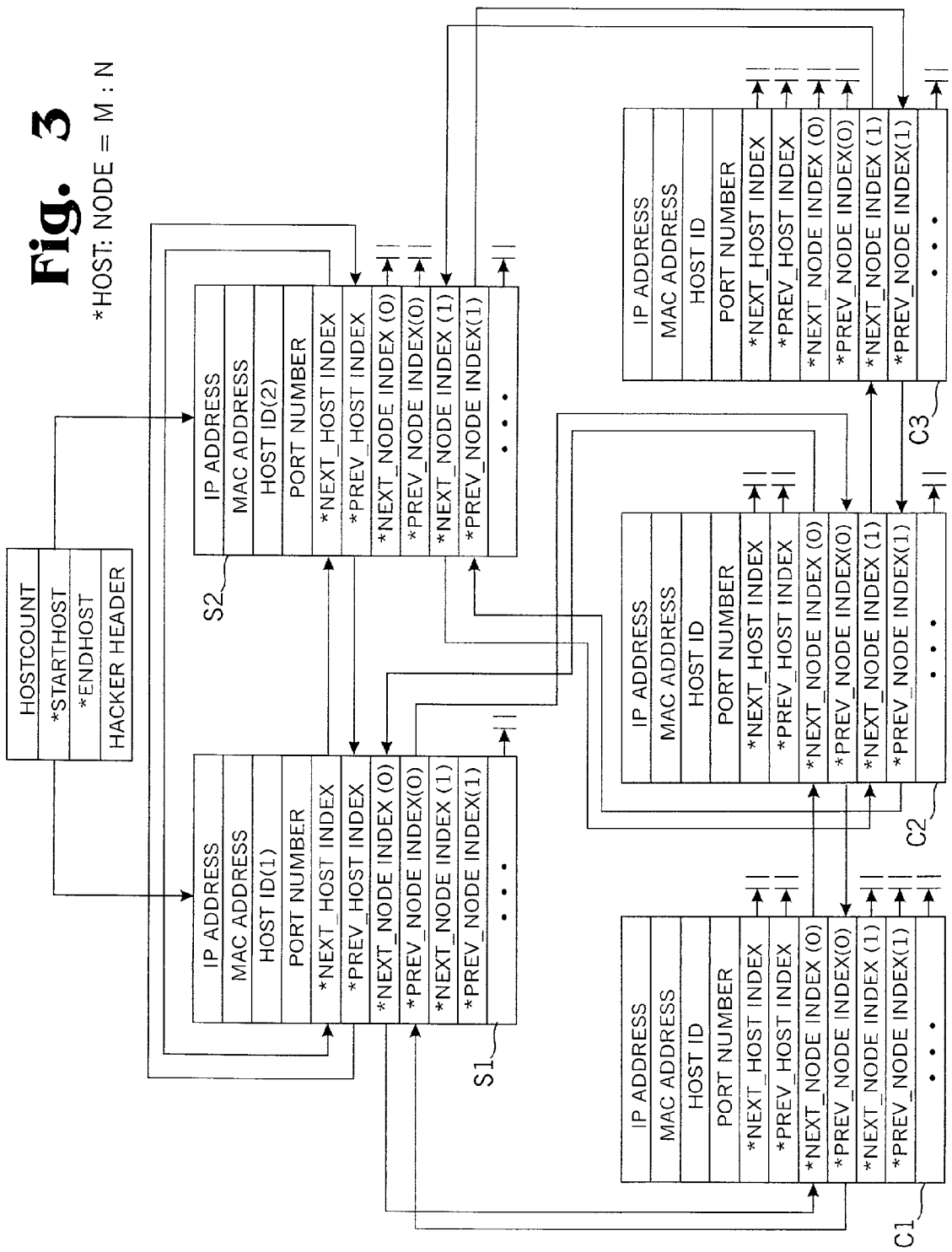
FIG. 3 illustrates an anti-hacker table (or hacker table) according to the embodiment of the present invention.

FIGS. 2-1 and 2-2 are flowcharts illustrating a control operation for registering one entry of server or client node using MAC addresses according to the embodiment of the present invention and FIG. 3 illustrates an anti-hacker table stored in host 100 according to the embodiment of the present invention.

Referring to FIGS. 1, 2-1, 2-2, and 3, an anti-hacker database for restricting communication according to the present invention can be considered in two parts. One part is _hackertbl for managing client nodes to communicate with a server node that wants security, as constituted below. This table is used to hold both a server node and a client node. The HostIndex is for the server node and the NodeIndex is for the client nodes.

```
struct_hackertbl {
u32 Hostid;                                         /a 32 bit Node ID/
u32 IpAddress;                                      /IP address of the Node/
u8 EtherAddress[6];                                 /MAC (Ethernet) address of the Node/
u16 Port;                                           /Port number where the Node resides/
struct_hackertbl *Next_HostIndex;                   /pointer of next server Node's hackertbl/
struct_hackertbl *Prev_HostIndex;                   /pointer of previous server Node's hackertbl/
struct_hackertbl *Next_NodeIndex[MAX_SECURITY_HOSTS];
                                                    /pointer array of next client Node's hackertbl/
struct_hackertbl *Prev_NodeIndex[MAX_SECURITY_HOSTS];
                                                    /pointer array of previous client Node's hackertbl/
```

The other part is _hackerhead as anti-hacker headers to maintain the above pointers, as constituted below. Several Server to Client mappings can be in one system. At once, M to N server to client node mappings is possible.

```
    struct_hackerhead {
u32 Hostid_Index {MAX_SECURITY_HOSTS };
                                    /list array of Server Node's ID/
    struct_hackertbl *StartHostIndex;   /pointer of first Server Node's hackertbl/
    struct_hackertbl *EndHostIndex;     /pointer of last Server Node's hackertbl/
```

Main members of _hackertbl include pointers for managing the list of server nodes that want security to be guaranteed (*Next_HostIndex, *Prev_HostIndx), pointers for managing the list of client nodes communicable with corresponding server nodes (*Next_NodeIndex[], *Prev_NodeIndex[]), a node ID to be used as the index of * XXXX_NodeIndex (where XXXX refers to Next or Previous), the IP addresses and MAC addresses of nodes, and port numbers.

Main members of _hackerhead include an array including the IDs of security server nodes (HostID_Index) and pointers indicating a start server node and an end server node in the list of server nodes that want security (*StartHostIndex, *EndHostIndex).

FIG. 3 illustrates an anti-hacker database based on two data structures, server nodes and client nodes. In a network there are several server nodes that many client nodes try to access. Shown at the bottom of FIG. 3 are three client nodes C1-C3, and in the middle of FIG. 3 are two server nodes S1 and S2. As shown by the arrows, the first and second client nodes C1 and C2 are going to access the first server node S1, and the second and third client nodes C2 and C3 are going to access the first server node S1 and the second server node S2.

In the anti-hacker database shown in FIG. 3, *XXXX_HostIndex (where XXXX refers to Next or Previous) connects the tables of the server nodes; *XXXX_NodeIndex(x) (where x is either 0 or 1) connects the tables of the client nodes to each other and to the server nodes, i.e. *XXXX_NodeIndex(0) connects a client node to the first server node and an adjacent (next or previous) client node, whereas XXXX_NodeIndex(1) connects a client node to the second server node and an adjacent (next or previous) client node.

Registration of a client node that is to be allowed to communicate with a server node in the anti-hacker database shown in FIG. 3 in the Ethernet switch of FIG. 1 will be described with reference to FIGS. 2-1 and 2-2.

Two processes are needed to register one entry of a server node or a client node. One process (FIG. 2-1) takes place when a user inputs a command through a console (not shown). Another process (FIG. 2-2) takes place when a new packet from a client node comes into the Ethernet switch. The first process configures the anti-hacker table and then updates an address entry field if the MAC address is in address entry table 152. In this process, if there is no corresponding entry in address table 152, then the security information update process is postponed until the packet which has the corresponding address as a source address comes into the Ethernet switch (process FIG. 2-2). The second process registers one address entry to address table 152 and then updates the security information for this address entry if it is in the anti-hacker table.

In step 201, the host 100 receives a security server node address and an access client node address from a user's console (not shown) An entry command for the security server node can be ahaddhost<1 00:00:f0:aa:bb:cc 168.219.83.147>, by way of example. Here, 1 is a HostID, 00:00:f0:aa:bb:cc is a MAC address and 168.219.83.147 is an IP address. Upon receipt of the command, the transmission/reception controller 120 adds anti-hacker table entry ([0030]) information for the input MAC address to the anti-hacker table without a port number in step 202. In step 203, the transmission/reception controller 120 checks whether the input MAC address is present in address table 152 of packet memory 150. If address table 152 does not have the MAC address, transmission/reception controller 120 finishes its work. If address table 152 has the MAC address, in step 204, transmission/reception controller 120 reads the corresponding address entry from address table 152 and modifies the access vector field of the MAC address to a new access vector to be used as a security key. In step 205, transmission/reception controller 120 updates the address entry of address table 152. An access vector consists of a bit vector. The bit value "0" means restriction to access and "1" means allowance for access. For example, if a server node S1 has an access vector 00010000 and a client node C1 has access vector 10000001, then client node C1 cannot access server node S1, but another client node C2 having access vector 00010001 can access server node S1. For further understanding, access vector 00010000 of a server node S1 means that S1's HostID is 3, and its access vector is 0×80>>3. If C1 is going to be an access client node, the access vector of C1 should be (0×80>>3). If the access vector of C1 is 10010001, then this access vector 10010001 means C1 can access server nodes that have HostID 0, 3 or 7. Thus a client node having an access vector xxx1xxxx (x can be a 0 or 1) can access a server node having a HostID of 3, and a client node having an access vector xxx0xxxx (x can be a 0 or 1) is restricted from accessing a server node having a HostID of 3.

In step 203, if the MAC address is absent in address table 152, that means transmission/reception controller 120 cannot modify the access vector of the MAC address. The security information update process is postponed until the packet which has the corresponding address as a source address comes into Ethernet switch (process FIG. 2-2). In step 211 of FIG. 2-2, upon receipt of a packet which has a new MAC source address, that is absent in address table 152, from a node through the first to nth MAC ports 110 to 10n for communication with the host, transmission/reception controller 120 makes a new address entry, in step 212, with information including an access vector field for the new MAC source address. The address entry information also includes a port number of MAC ports 110 to 10n through which the packet was received.

In step 213, transmission/reception controller 120 checks whether the new MAC source address is present in the anti-hacker table, and if not, step 216 is performed. If the anti-hacker table has the MAC address, transmission/reception controller 120 adds, in step 214, a port number into the port field (i.e., u16 Port) of the anti-hacker table. In step 215, transmission/reception controller 120 modifies an access vector field, included in the address entry configured in step 212, of the new MAC source address for storage in address table 152 to be used as a security key.

In step 216, the transmission/reception controller 120 adds the address entry, configured in step 212, into address table 152.

There will be given a description of communication between a client node and the server node after the security function is set for client nodes communicable with the server node.

Upon receipt of a packet from a client node through the first to nth MAC ports 110 to 10n for communication with the server node, the transmission/reception controller 120 reads the MAC address entries of the destination server node and the source client node from address entry 152 and determines whether the access vector bit, as the security key of a destination server node, is set to the access vector bit as the restriction key of the source client node in the process of an address analysis. If it is not, a normal packet switching operation is performed and otherwise, the received packet is discarded.

Eventually, the security key is set to the access vector of a server node (destination node) and the restriction key is set to the access vector of a client node (source node).

In accordance with the present invention as described above, client nodes communicable with a server node are registered preliminarily in an Ethernet switch so that unauthorized client nodes are denied access in a lower layer. Consequently, security is reinforced to prevent hacking.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A MAC (media access control) address-based communication restricting method using access vectors, the method comprising the steps of:
   receiving packet data upon request of communication through at least one port of a plurality of ports of an Ethernet switch;
   reading a MAC destination address and a MAC source address included in the received packet data;
   detecting, in an address table, access vectors corresponding to the MAC destination and source addresses, wherein the access vectors are stored in address tables and indicate whether two nodes, corresponding to a MAC source address and a MAC destination address, may access each other; and
   denying access if the access vectors of the MAC destination and source addresses are not matched.

2. A packet switch communication method, comprising the steps of:
   receiving packet data upon request of communication through at least one port of a plurality of ports of said packet switch;
   reading a MAC (media access control) destination address and a MAC (media access control) source address included in said received packet data;
   determining whether said MAC source address is stored in an address table having address entries including access vectors indicating whether allowance for access of client nodes is made or not, wherein each client node is identified by at least a corresponding MAC address;
   when it is determined that said MAC source address is stored in said address table, determining whether an access vector corresponding to said MAC destination address is matched with an access vector corresponding to said MAC source address, wherein both of the access vectors are stored in said address table;
   if the access vectors corresponding to said MAC destination and source addresses are matched, transmitting said received packet data to MAC destination address; and
   denying access if said access vectors of said MAC destination and source addresses are not matched.

3. The method as set forth in claim 2, further comprising steps of:
   configuring an anti-hacker table comprising information pertaining to a plurality of the client nodes and a plurality of server nodes of a network, wherein each server node is identified by at least a corresponding MAC address;
   when it is determined that said received MAC source address is not stored in said address table, determining whether information corresponding to said received MAC source address is stored in said anti-hacker table; and
   when it is determined that said received MAC source address is stored in said anti-hacker table, modifying the access vector of said MAC source address to a security key, to thereby store a modified address in the said address table.

4. The method as set forth in claim 3, further comprising steps of:
   adding a port number, corresponding to the port through which said packet data was received, to a storage area corresponding to said MAC source address received in said anti-hacker table.

5. A packet switch communication method, comprising the steps of:
   receiving packet data upon request of communication through at least one port of a plurality of ports of said packet switch;
   reading a MAC (media access control) destination address and a MAC (media access control) source address included in said received packet data;
   determining whether said received MAC source address is stored in an address table having an access vector indicating whether allowance for access of client nodes is made or not, wherein each client node is identified by at least a corresponding MAC address;
   when it is determined that said received MAC source address is not stored in said address table determining whether information corresponding to said received MAC source address is stored in an anti-hacker table; and
   when it is determined that said received MAC source address is stored in said anti-hacker table, modifying the access vector of said MAC source address to a security key, to thereby store a modified address in the said address table, said anti-hacker table comprising information pertaining to a plurality of said client nodes and a plurality of server nodes of a network, wherein each server node is identified by at least a corresponding MAC address.

6. A MAC (media access control) address-based communication restricting packet switch comprising:
  a plurality of MAC ports;
  a data exchange for establishing paths of packet data between MAC ports
  a packet memory storing an address table having an access vector indicating whether allowance for access of client nodes is made or not, wherein each client node is identified by at least a corresponding MAC address;
  a transmission/reception controller controlling data exchange;
  wherein said transmission/reception controller reads a MAC destination address and a MAC source address included in said received packet data from MAC ports, transmits said received packet data to a MAC destination address when said received MAC source address is stored in said address table and if an access vector corresponding to said received MAC destination address is matched with an access vector corresponding to said received MAC source address, denies access if said access vectors of said received MAC destination and source addresses do not match.

7. The MAC address-based communication restricting packet switch as set forth in claim 6,
  when said received MAC source address is not stored in the address table, and if information corresponding to the received MAC source address is stored in an anti hacker table, modifying the access vector of said MAC source address to a security key, to thereby store a modified address in the said address table, wherein said anti-hacker table comprise information pertaining to a plurality of client nodes and a plurality of server nodes, wherein each server node is identified by at least a corresponding MAC address.

8. The MAC address-based communication restricting packet switch as set forth in claim 7, wherein said transmission/reception controller adds a port number, corresponding to the MAC port through which said data packet was received, to a storage area corresponding to said received MAC source address in said anti-hacker table.

* * * * *